(12) United States Patent
Hofmann

(10) Patent No.: US 8,123,233 B2
(45) Date of Patent: Feb. 28, 2012

(54) CLAMPING DEVICE

(76) Inventor: Klaus Hofmann, Bruck (DE)

( * ) Notice: Subject to any disclaimer, the term of this patent is extended or adjusted under 35 U.S.C. 154(b) by 1059 days.

(21) Appl. No.: 11/996,070

(22) PCT Filed: Jul. 17, 2006

(86) PCT No.: PCT/DE2006/001226
§ 371 (c)(1),
(2), (4) Date: Jan. 17, 2008

(87) PCT Pub. No.: WO2007/009439
PCT Pub. Date: Jan. 25, 2007

(65) Prior Publication Data
US 2008/0217872 A1    Sep. 11, 2008

(30) Foreign Application Priority Data
Jul. 18, 2005 (DE) .......................... 10 2005 033 468

(51) Int. Cl.
*B23B 31/30* (2006.01)
(52) U.S. Cl. ..................... 279/4.05; 279/4.01; 279/4.12; 92/90
(58) Field of Classification Search ................ 279/4.01, 279/4.03, 4.05, 4.1, 4.11, 4.12, 46.7, 66, 279/139; 269/20, 32, 34; 92/90; 188/151 R; 403/31; *B23B 31/30, 31/32*
See application file for complete search history.

(56) References Cited

U.S. PATENT DOCUMENTS
2,304,737 A * 12/1942 Maeder ....................... 73/382 R
(Continued)

FOREIGN PATENT DOCUMENTS
CH    549 437    5/1974
(Continued)

OTHER PUBLICATIONS

Communication from German Patent and Trademark Office dated Jan. 4, 2006 (German Application No. 10 2005 033 468.7-15)(8 Pages).

*Primary Examiner* — Eric A Gates
(74) *Attorney, Agent, or Firm* — The Culbertson Group, P.C.

(57) ABSTRACT

The invention relates to a clamping device, especially for releasably clamping a machine tool having a fixing element extending therefrom. The clamping device includes a deforming clamping element which acts on a clamping part with a clamping force in order to secure the fixing element to the clamping device. The deforming clamping element may also be controlled to act on the clamping part with a releasing force in order to release the fixing element from the clamping device. Both the clamping force and the releasing force result from the deformation of the deforming clamping element.

20 Claims, 8 Drawing Sheets

U.S. PATENT DOCUMENTS

| | | | |
|---|---|---|---|
| 2,462,501 A * | 2/1949 | Hohwart et al. | 279/136 |
| 2,568,585 A * | 9/1951 | Hohwart et al. | 279/139 |
| 2,709,599 A * | 5/1955 | Mann | 279/4.05 |
| 4,428,737 A * | 1/1984 | Schwenzfeier et al. | 464/28 |
| 5,134,889 A * | 8/1992 | Bradbury | 73/731 |
| 5,174,585 A * | 12/1992 | Erkki | 279/2.08 |
| 5,431,089 A | 7/1995 | Sawdon | |
| 6,311,987 B1 * | 11/2001 | Rinne et al. | 279/4.03 |
| 6,629,584 B1 | 10/2003 | Muller | |
| 7,392,886 B2 * | 7/2008 | Hofmann | 188/151 R |
| 7,584,828 B2 * | 9/2009 | Hofmann | 188/67 |
| 7,861,830 B2 * | 1/2011 | Hofmann | 188/67 |

FOREIGN PATENT DOCUMENTS

| | | |
|---|---|---|
| CH | 654 512 A5 | 2/1986 |
| DE | 197 05 684 A1 | 8/1998 |
| DE | 198 53 808 A1 | 6/2000 |
| DE | 199 17 005 C1 | 10/2000 |
| DE | 200 22 353 U1 | 8/2001 |
| DE | 101 17 485 A1 | 10/2002 |
| DE | 103 12 192 B3 | 8/2004 |
| DE | 103 17 347 A1 | 11/2004 |
| EP | 1 321 221 A1 | 12/2002 |
| WO | WO 01/34990 A1 | 5/2001 |
| WO | WO 2004067222 A1 * | 8/2004 |
| WO | WO 2005/015047 A1 | 2/2005 |

* cited by examiner

CLAMPING DEVICE

FIELD OF THE INVENTION

The present invention relates to a clamping device, in particular for machine tools.

BACKGROUND

In machine tools of the type known to the state of the art, workpieces are processed which can be mounted in different ways. Known are, in particular, those devices in which the workpiece is screwed by means of spring chucks against a machine bed and is released again by loosening the screw accordingly. In addition, clamping devices are known, which are screwed to the work table of the machine and are constructed or arranged specifically for a certain workpiece. When changing the workpiece or the workpiece type, the clamping device must be dismantled and set up again each time and the zero point must again be determined.

Furthermore, the need is known for arranging and fixing several workpieces ideally simultaneously in the processing area of a machine tool or for removing them from there. For this purpose, the workpieces can be arranged fixed together on a carrier, a type of pallet or the like, in order to then fix the carrier as a whole in the processing area of the machine tools. After completion of processing, the carrier is loosened and removed again as a whole from the fixing device.

Generally known are clamping devices in which a fixing element is used indirectly or directly as a carrier for a workpiece that can be locked in a receptacle. Locking or loosening is thus equivalent to the fixing or releasing of the fixing element. These clamping devices, however, are complicated in construction and involved in operation.

The problem of the invention is to offer a clamping device, especially for machine tools, that has a simple construction for setup and is simple to operate.

SUMMARY OF THE INVENTION

The invention uses a special clamping element, which can clamp or release a fixing element into or out of a receptacle or a seat. In this way, it has proven especially advantageous that very high clamping forces can be applied through relatively small actuation forces in the clamping element in order to hold the fixing element reliably. For this purpose, the clamping element advantageously requires less installation space and exhibits very low wear.

A simplest embodiment of the clamping element is formed in a body that is screwed tightly, for example, to the machine bed. The body has a receptacle for inserting or removing a fixing element. The fixing element carries the workpiece or a corresponding carrier which carries the workpiece or workpieces to be processed. The receptacle itself can be constructed in a simplest case in the sense of a pot-shaped recess in the body.

For the detachable fixing of the fixing element, the clamping device includes at least one clamping element also to be described in more detail and at least one clamping part that can receive a clamping force from the clamping element. The clamping part is arranged according to the invention so that it can move in one motion B along a clamping part movement axis for clamping or releasing the fixing element in the receptacle.

According to the invention, the clamping element has at least one deformable chamber that can be pressurized with higher pressure or a lower pressure. This chamber is bounded at least partially by at least one tension-resistant or pressure-resistant wall. The chamber or the walls are here constructed according to the invention so that pressurization of the chamber deforms this chamber, and this deformation causes tensile and compressive forces within the walls and especially in their longitudinal direction. The forces appearing as such essentially in the longitudinal direction of the chamber walls are picked up at a suitable position (preferably at the edge of the walls) and transmitted into the clamping part directly or indirectly, so that this clamping part fixes or releases, on its side, the fixing element in the receptacle.

As will be seen with reference to the description of the figures, through a clamping element constructed in this way with relatively little fluid-dynamic pressures in the chamber, a very high deformation force can be generated in the chamber walls or picked up at the edges bounding the walls in their longitudinal direction. Therefore, overall the clamping device can have a relatively small structure and nevertheless can provide for secure holding of the fixing element in the receptacle. As another advantage relative to the state of the art, it should be mentioned that the clamping element can be activated with essentially any fluid, especially air, for pressurizing its chamber. Compressed air is typically available in the vicinity of the previously mentioned machine tool or processing center, is environmentally friendly, and is economical.

The number of individual components of the clamping device is also relatively small, which overall represents a technically elegant and economical alternative to the known clamping devices according to the state of the art.

An advantageous embodiment of the invention provides that the deformation of the chamber of the clamping element generating the deformation force is directed essentially perpendicular to the deformation force. This effect occurs especially in chambers, in which inner dimensions are considerably smaller than the dimensions in the two perpendicular directions. When such a chamber is pressurized (below, the term pressurization should also always be understood as "application" of lower pressure relative to the surroundings, in which higher pressure exists outside of the chamber), the wall regions lying at a short distance relative to each other are pressed apart from each other (or also toward each other for a lower pressure). The resulting bulging the chamber leads to shortening of the chamber dimensions in at least one of the two longer directions by means of the tension-resistant or pressure-resistant walls. If this shortening (or lengthening for the opposite pressurization) is prevented, then a deformation force counteracting this change in length appears. According to the invention, the deformation force should act on the fixing element directly or optionally transmitted as a clamping force, in order to fix it in the receptacle or to release it in the opposite case.

The deformation force is produced according to the invention more the most part through the conversion of fluid-dynamic pressure forces within the chamber into forces that run along the (ideally opposing) walls and that can be picked up at their end as tensile or compressive forces. Indeed, for pressurization, the short wall section, which connects the two closely adjacent walls, also experiences a corresponding compressive force, but the chamber according to the invention should be constructed so that this portion does not significantly contribute to the resulting deformation force.

Ideally, the chamber consists essentially of two opposing, closely spaced walls. Obviously, the arrangement of several such chambers in the sense of a chamber package is also conceivable, in which the walls lie essentially parallel and are joined in their end regions, so that the deformation force can be picked up there collectively or jointly.

Another embodiment of the invention provides that at least one wall has a convex or concave structure relative to the interior of the chamber in the state without pressurization. Such deformed chambers also have, in the pressure-less state, a certain basic stability and impart the extent of the change in length via the extent of the bulging, which results in a maximum when the walls are flattened by the pressurization. According to the curvature and flexibility of such walls, the change in length of the chamber can be given relatively precisely.

It is obvious that for the previously described purpose, the walls of the chamber must indeed have a flexible construction, which, however, is tension-resistant or pressure-resistant in their longitudinal direction, in order to transfer the forces occurring in their longitudinal direction as unchanged as possible to the edge. In particular, constructions in the form of metal shells or several overlapping thin metal films are conceivable. A stable, woven, preferably metallic network, which is surrounded by a flexible but compact medium (for example, a type of rubber mat with embedded steel fabric), can serve for the previously described purpose. Obviously, any other material can also be used, which on the one hand has flexibility, but on the other has the necessary stiffness and, in particular, tension and compression resistance.

The deformation force generated by means of the clamping element should act according to the invention as a clamping force on the fixing element. The deformation force is here picked up at a suitable position, especially at the edge of the adjacent chamber walls and transferred to the clamping element. This traces the previously described motion B based on the change in length of the chamber and therefore allows its shifting in the direction toward or away from the fixing element.

The resulting forces can have essentially a dual formation. First, the deformation of the chamber itself can be used directly to convert the change in length resulting from the deformation into a force, which disappears again for the reverse deformation of the chamber. Conversely, the chamber can also be somewhat biased through deformation, because the chamber walls tend toward their reverse deformation into the original position for sufficient stiffness. If the pressure on the chamber is again taken away, the restoring forces force the chamber back into its original shape, wherein a clamping force results from the reverse deformation. The last variant has the advantage that for clamping no pressure medium (especially air, hydraulic oil, etc.) is required due to lack of pressurization of the chamber. This increases the security of the system.

In the simplest case, the deformation force generated by the clamping element is introduced into the clamping element with the same magnitude and in the same direction and thus corresponds to the clamping force, which guarantees an especially simple construction. However, it is also conceivable to increase or decrease the deformation force into the clamping force or also to change the direction. Thus, the deformation force can be deflected, e.g., by means of a lever construction or can be converted into a clamping force, so that the two forces enclose an angle of 90° (or another other desired angle). This enables the essentially flexible arrangement of the clamping element relative to the fixing element.

In an advantageous embodiment of the invention, the clamping part has a wedge surface running at an angle to the clamping force, which interacts for the motion B with a surface of the fixing element for releasing or fixing the fixing element. Thus, if the clamping part moves, for example, in the direction toward the fixing element, in order to clamp it, then an angled wedge surface provided on the clamping part interacts with a corresponding surface of the fixing element, so that for further advancing of the clamping part, the wedge surfaces transfer a motion component perpendicular to the clamping force and thus move the fixing element a certain extent along its longitudinal axis, in particular, press it and clamp it tightly in a seat or against a stop. For the reverse motion, if the clamping part is moved away from the fixing element, the wedge surfaces releasing from each other permit a loosening of the fixing element from its clamping seat or stop. This is to be seen in detail in the description of the figures.

An especially advantageous embodiment is characterized in that the fixing element or the clamping element has an essentially rotationally symmetric structure. For the rotationally symmetric shape of the clamping element, this can essentially surround the fixing element and can thus apply a corresponding deformation or clamping force from all sides toward the center. The clamping element can be made from two opposing washer rings, which essentially enclose the chamber between themselves. The ring sections lying opposite each other can also be constructed convex or concave relative to each other.

If the fixing element also has a rotationally symmetric structure, then it can be inserted into a receptacle along its longitudinal direction in the center of the ring-shaped clamping element and can be fixed there in principle independent of its rotational position. Other shapes of the fixing element are also conceivable, of course, and the clamping element also need not enclose the fixing element in the form of a ring. Also, an arrangement of a clamping element on only one side of the fixing element is conceivable, in order to clamp or to loosen the fixing element through the change in length of the chamber or the resulting deformation force or clamping force.

For a ring-shaped clamping element, if the opposing chamber walls are fixed in three dimensions at the outer diameter (for example, to the body), then the change in length takes place exclusively toward the center of the ring, whereby the clamping motion or clamping force can have a very effective action from all sides on the fixing element arranged in the center.

So that a fixing element to be fixed in the center of the clamping device can be successfully clamped, the clamping part arranged around the fixing element can be constructed as a surrounding, slotted clamping ring. Then the clamping ring can yield to the clamping forces acting on all sides from the outside to the inside under radial deformation, wherein the slot of the clamping ring narrows. Such a surrounding ring generates especially homogeneous clamping forces around the fixing element, with the exception of the slotted region.

Obviously, the use of individual clamping jaws is also conceivable, which do not have to be connected to each other and which also interact in a straight, that is, uncurved, shape with a complementarily shaped fixing element.

Another embodiment of the invention provides that the clamping part is biased against or in the direction of the clamping force. In this way, an opening or closing motion of the clamping part relative to the fixing element is supported. Thus, for example, for a fixing element, which is arranged centrally and which is surrounded by a ring-shaped clamping element, the clamping part features biasing against the clamping force directed inward. Here, if the pressure-less state of the chamber corresponds to the unclamped state of the clamping part, then the biased clamping ring advantageously supports the opening motion. Conversely, it is of course conceivable to provide the clamping ring with biasing directed inward in order to maintain, in principle, the clamping state and to be expanded only through a deformation force of the clamping element acting opposite to this clamping.

According to the invention, it can be further provided that the receptacle holding the fixing element be equipped with a centering cone, which, for a clamping force acting on the fixing element, interacts with this fixing element. In this way, the cone should align the fixing element perpendicular to its longitudinal axis, while it is pressed or pulled into the clamping seat or against a stop by the clamping element. In this way it is possible, in principle, to align a fixing element to be inserted with a certain amount of play in a desired way and to fix it there.

An embodiment in which the centering cone is supported in a floating or spring-mounted manner for positional compensation by a predetermined tolerance is presented as especially advantageous. Here, an alignment of the fixing element perpendicular to its longitudinal axis with a certain tolerance should be permitted, while the fixing element is clamped. In this way, changes in length, especially those due to temperature fluctuations, can be compensated. This is especially important when several clamping devices, which each hold, on their side, a fixing element, are provided within a machine tool, wherein the fixing elements receive a carrier in common and therefore are connected to each other. To permit the fixed distance of the fixing elements to each other, on the one hand, or of the clamping devices to each other, on the other, with certain tolerances, the previously mentioned centering cone is provided with a floating or spring-mounted support. Here, it can be formed, for example, in a flexible medium embedded in the receptacle.

This can be, in particular, a sealing ring surrounding the fixing element in which the centering cone was molded and which is inserted with this together in the receptacle. The centering cone is then held by the sealing ring, but can still shift slightly perpendicular to the longitudinal axis of the fixing element.

Alternatively, the floating support can also be constructed by an essentially free end of a sleeve-shaped projection, whose opposite, fixed end is formed on or fixed to the receptacle or the body. In this case, the material quality or stiffness of the centering cone is the decisive feature for its movement perpendicular to the longitudinal axis of the fixing element.

According to another advantageous embodiment of the invention, as a centering aid for a workpiece to be inserted into the receptacle with the fixing element, at least longitudinal grooves directed over the periphery about the longitudinal axis and running in the radial direction are provided in the body. These interact, according to the invention, with pins, which project from the workpiece to be fixed or a holder carrying this workpiece during the insertion into the grooves and therefore definitely center the workpiece.

These and other advantages and features of the invention will be apparent from the following description of the preferred embodiments, considered along with the accompanying drawings.

DESCRIPTION OF ILLUSTRATIVE EMBODIMENTS

Figure 1:
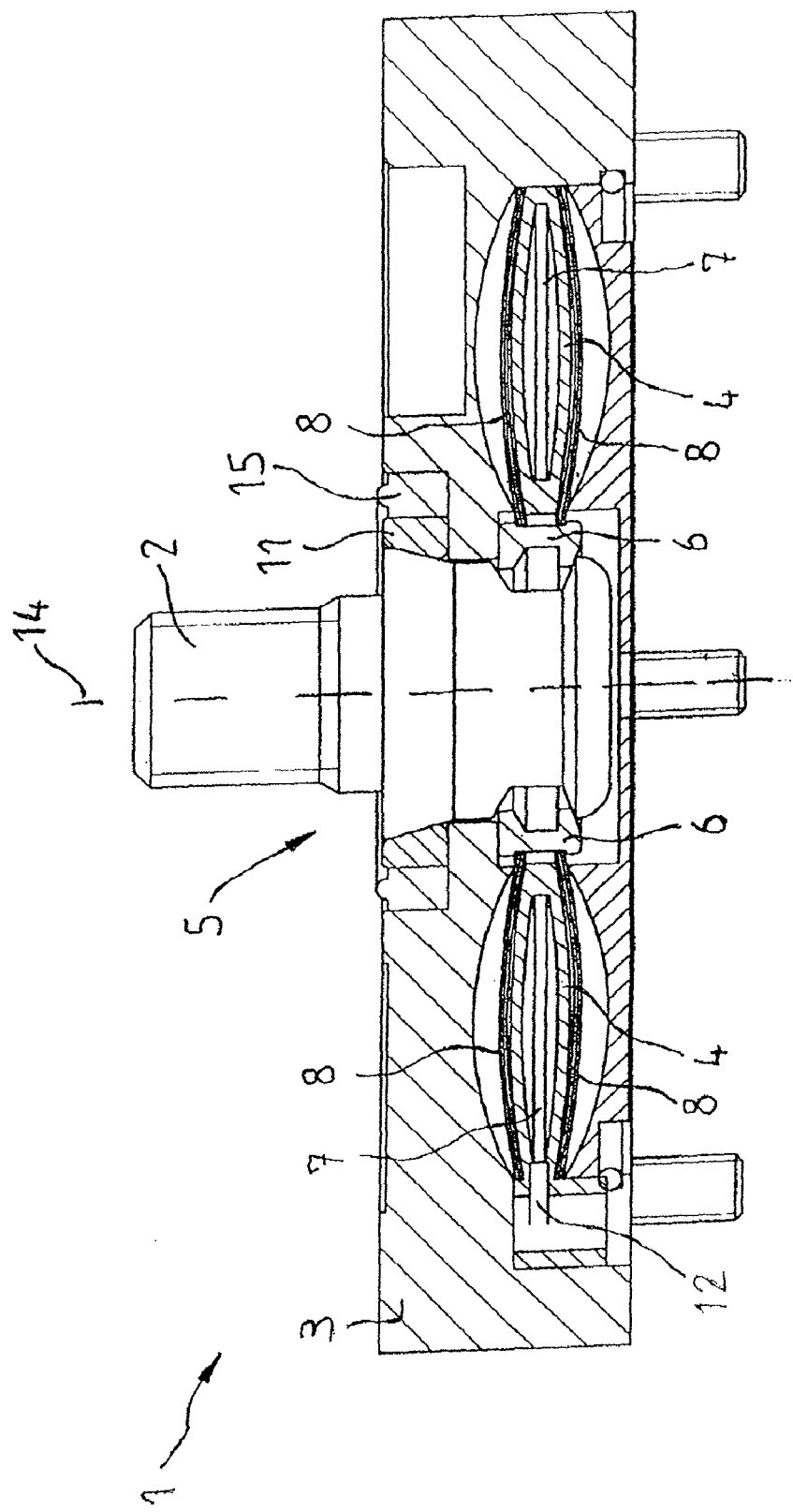
FIG. 1 is a schematic side view of a first embodiment of the clamping device according to the invention in the clamping state.

An embodiment of a clamping device according to the invention is shown in FIG. 1. In a body 3, a fixing element 2 is detachably inserted (the fixing element 2 should carry a workpiece carrier 17 indicated schematically in FIG. 5). For this purpose, the body 3 has an approximately pot-shaped receptacle 5 in which the fixing element 2 can be inserted. The fixing element 2 is rotationally symmetric about its longitudinal axis 14. It is noted that the receptacle also includes a longitudinal axis which coincides with fixing element axis 14 when the fixing element 2 is received in the receptacle 5 in the inserted position shown in FIG. 1.

In the inserted state of the fixing element 2, it is surrounded on all sides by a clamping element 4 arranged in the body 3 and lying in its center. The clamping element 4 is essentially formed from two opposing ring-shaped walls 8, which are slightly bent in cross section and which mainly enclose a chamber 7 due to their convex alignment relative to each other. The walls 8 are produced from a flexible but tension-resistant and pressure-resistant material.

The clamping element is fixed by the receptacle in the body 3 in the radial direction at the outer peripheral edge of the clamping element 4. A clamping part 6, which is connected to the walls 8, so that deformation of the chamber 7 or the walls 8 in the radial directions acts inward toward the clamping part 6 in the same direction, attaches to the inward facing edges of the clamping element 4. The clamping part 6 is moved in this case inward in the direction toward the fixing element 2, so that this is fixed, as shown in detail in FIG. 2.

Figure 2:
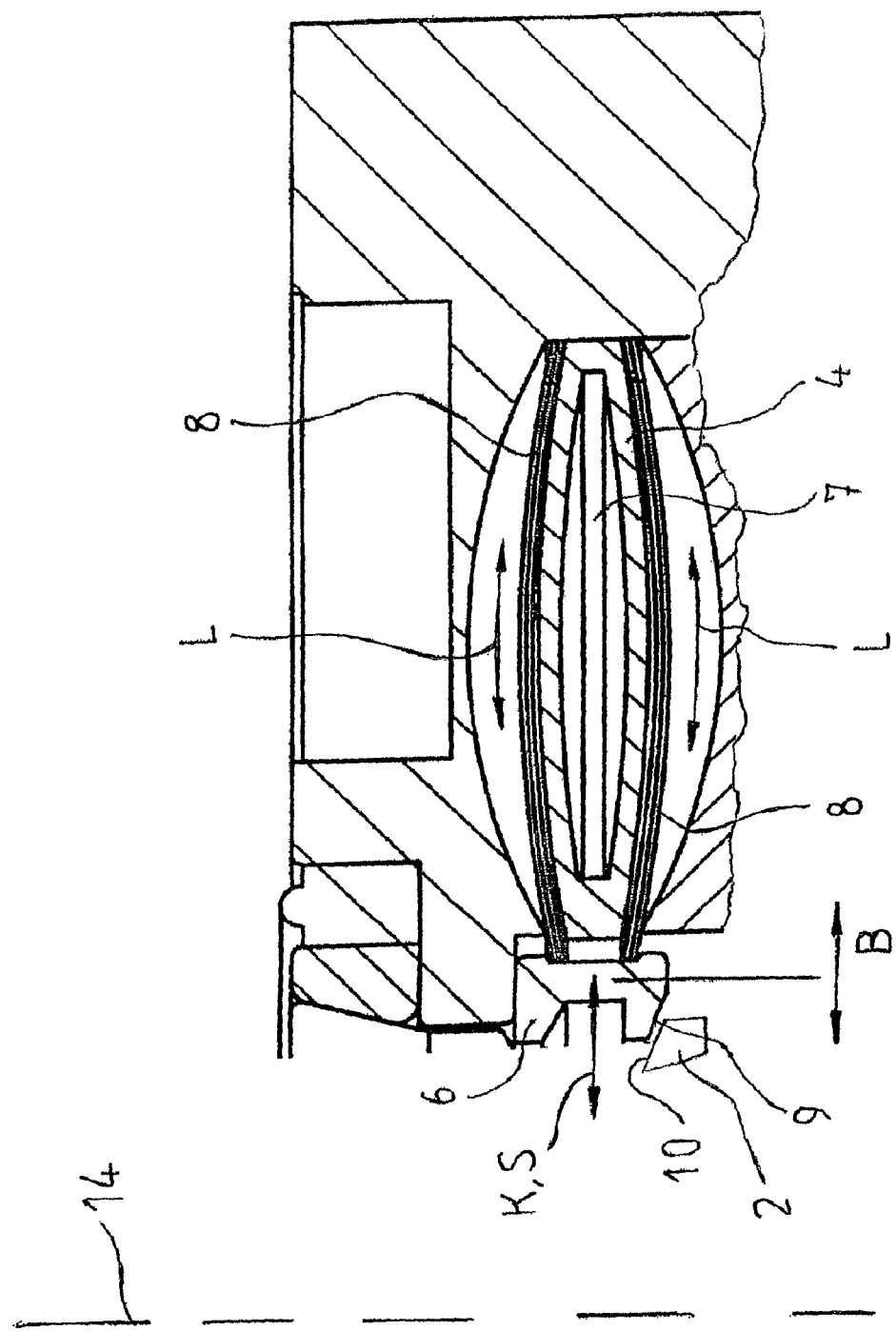
FIG. 2 is a schematic detail view according to FIG. 1.

In FIG. 2, in an enlarged schematic partial view, the part of the clamping element 4 lying to the right of the longitudinal axis 14 is shown. The chamber 7, which is enclosed by the walls 8, can be seen, wherein the walls 8 extend essentially in a longitudinal direction L.

Pressurization of the chamber 7 with a lower pressure causes the two opposite walls 8 to move toward each other, especially in the center of the chamber. Therefore, the walls 8 experience a lengthening in the horizontal direction shown in FIG. 2, which is transferred in the form of a deformation force S in the radial direction inward directly to the clamping part 6. The deformation force S shifts the clamping part 6 inward along the clamping part movement axis in a motion B. In this case, the deformation force S and the clamping force K are identical.

In the opposite case, for pressurization of the chamber 7 with higher pressure, the walls 8 undergo shortening in the horizontal direction, which follows the clamping part 6 in the reverse direction of the motion B, that is, directed outwardly along the clamping part movement axis. Here, the clamping part 6 can follow due to an inner biasing of this motion to the outside from its own drive, or for suitable connection of the walls 8 to the clamping part 6 can also be pulled outwardly by the walls 8 or the resulting deformation force S.

In FIG. 2, a smaller part of the fixing element 2 is further shown, which has a surface 10 at an angle relative to the motion B. This surface 10 interacts for the motion B with a wedge surface 9 provided on the bottom side of the clamping part 6, such that for the motion of the clamping ring 6 in the radial direction inward, the fixing element 2 is shifted via the contact with the surface 10 by a certain extent in the direction of its longitudinal axis 14 (also in the direction of the longitudinal axis of the receptacle 5) or fixed at least in this direction against a stop (not shown).

In contrast, if the clamping element 6 is opened outwardly to a sufficient extent in the radial direction, then the clamping part 6 releases the section shown in FIG. 2 for the fixing element 2 in the axial direction, so that the fixing element 2 can be completely removed upward from the receptacle 5.

Figure 3:
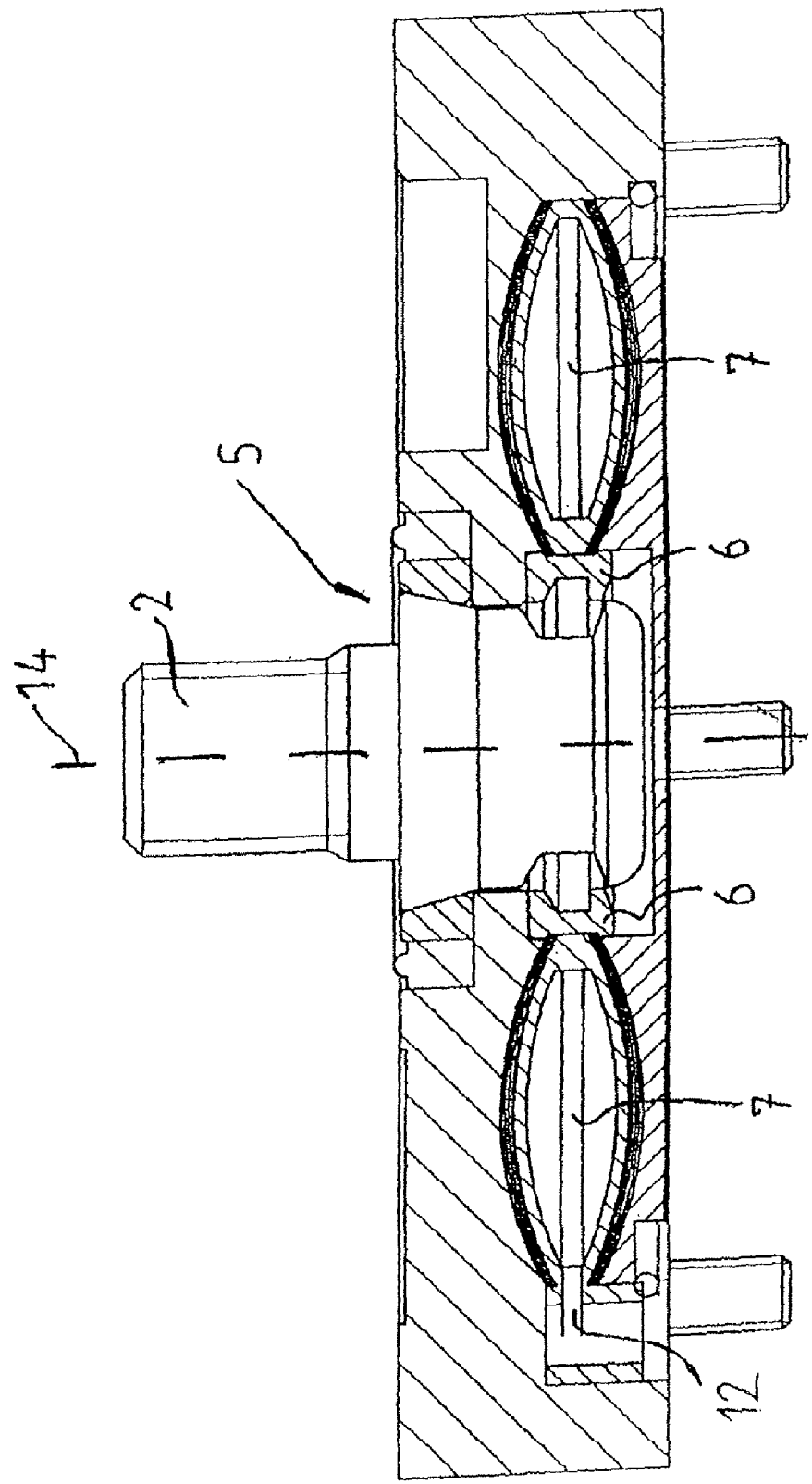
FIG. 3 is a schematic section view of the clamping device according to FIG. 1 in the released state.

While in FIG. 1 the clamped state is shown in which the clamping part 6 engages behind and thus fixes a part of the fixing element 2 in the receptacle 5, FIG. 3 shows the released state, in which the clamping part 6 is expanded outwardly in the radial direction far enough that the fixing element 2 can be removed in the direction of its longitudinal axis 14 upwardly from the receptacle 5. Only for the sake of completeness is the chamber 7 still designated in FIG. 3.

In FIGS. 1 and 3, it can be further seen that the chamber 7 has, in the left region of the body 3, an opening 12 for the supply of a compressed medium for pressurization.

In FIG. 1 it can be further seen that the fixing element 2 is oriented by a centering cone 11 in an upper section. The centering cone 11 is embedded floating via a flexible sealing ring 15 in the body 3, so that a certain radial offset of the fixing element 2 relative to its longitudinal axis 14 is possible before or during the clamping.

Figure 4:
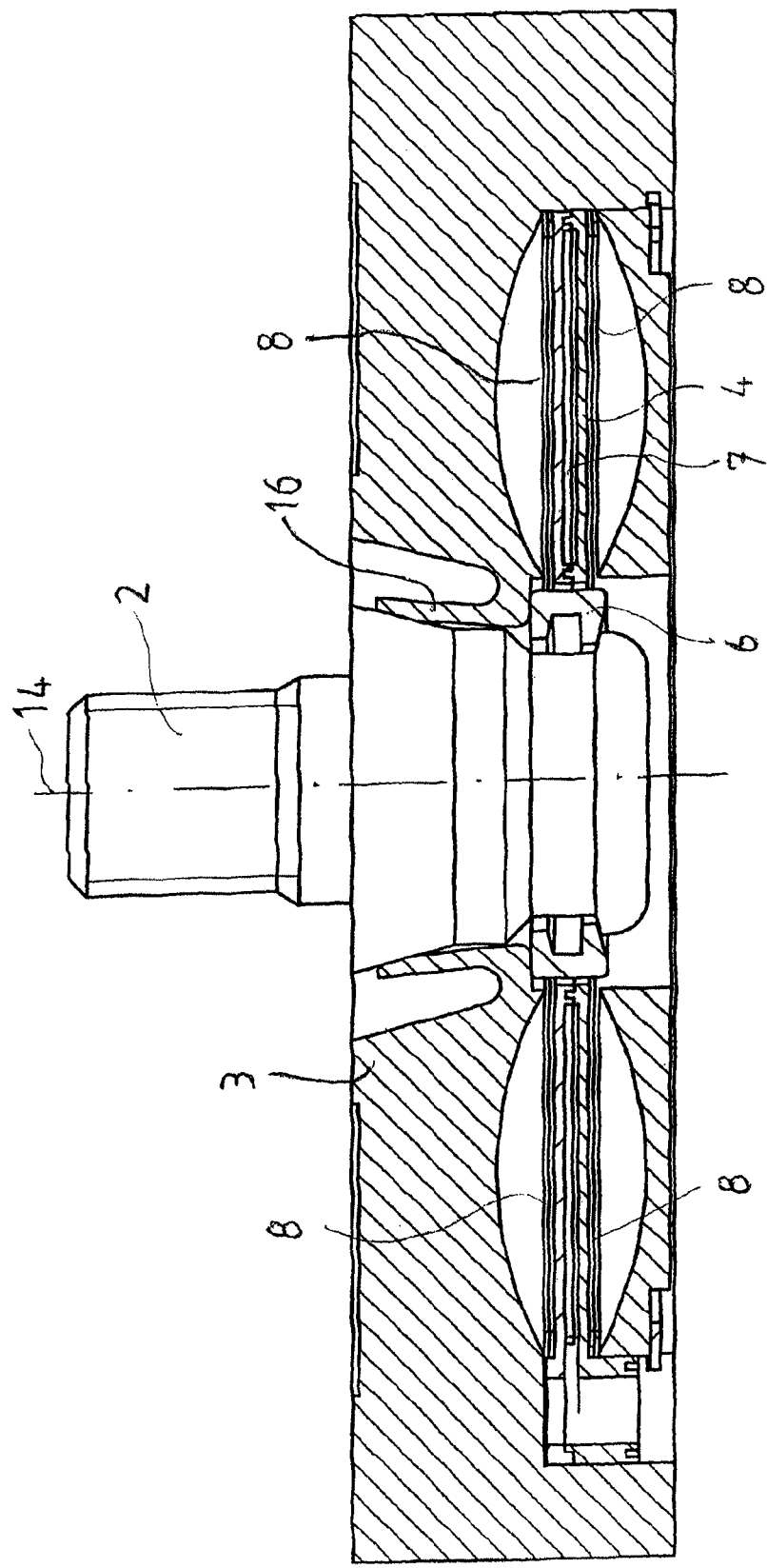
FIG. 4 is a schematic side view of a second embodiment of the clamping device according to the invention.

In FIG. 4, another embodiment of the clamping device is shown. The clamping element 4 shown in FIG. 4 has walls 8, which lie essentially parallel to each other when the clamping part 6 assumes the clamped state. Through pressurization of the chamber 7, the walls 8 are pressed apart from each other, which leads to a shortening of the walls 8 in the horizontal direction and to a corresponding expansion of the clamping part 6, by means of which the fixing element 2 is released.

When the clamping element 4 shown in FIG. 4 is not pressurized, it exerts a clamping effect on the fixing element 2. This fixing state thus occurs also for an undesired loss of the pressure supply or is then maintained without the fixing element 2 being able to become unintentionally loose.

Furthermore, in FIG. 4 another form of the centering cone is to be seen. The centering cone is constructed as an upward free end of a sleeve-shaped projection 16. Here, through the given stiffness of the projection 16 (dependent on its material and its cross-sectional shape) a possible offset is realized relative to the longitudinal axis 14, in order to receive the fixing element 2 at least within given tolerances in a floating way.

Figure 5:
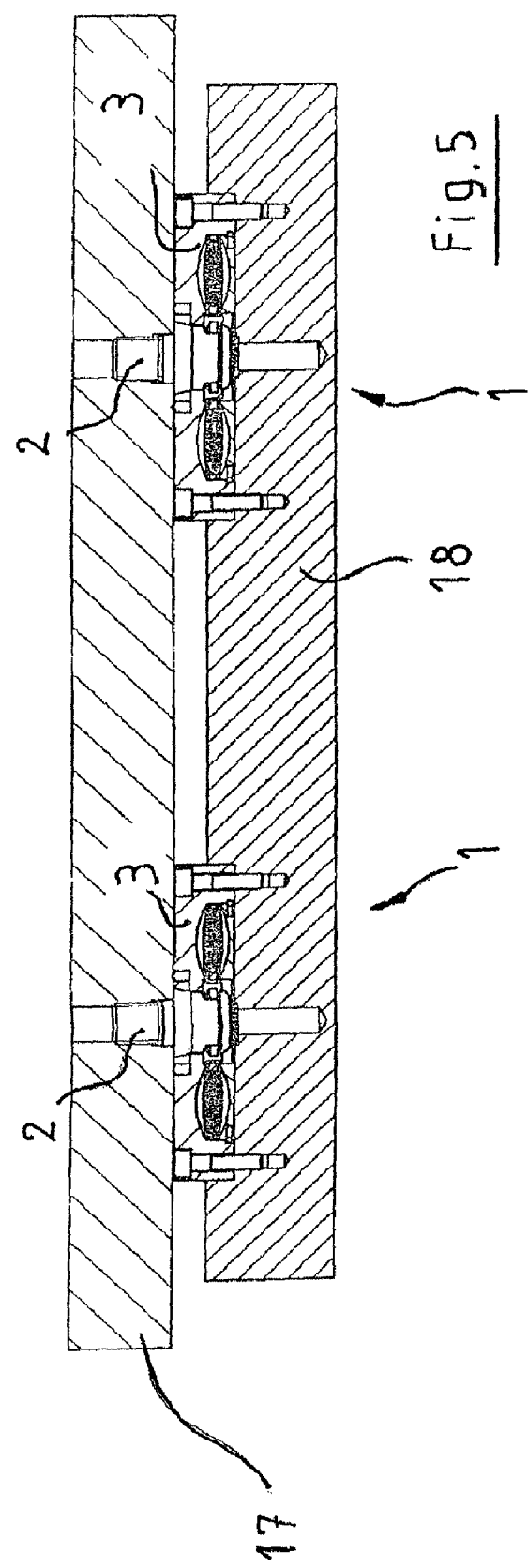
FIG. 5 is a schematic side view of two clamping devices inserted into a machine bed with a workpiece carrier arranged above.

For the sake of completeness, in FIG. 5 an arrangement of several clamping devices according to the invention is shown. Here, four clamping devices 1 sit in a machine bed 18 and are used for the common holding of a pallet-shaped carrier 17. The carrier 17 is held by the fixing elements 2, which are held by each clamping device 1. Furthermore, FIG. 5 shows that the stop for the fixing element 2, which is used for the clamping in the direction of the not-shown longitudinal axes, is formed by the support of the carrier 17 on the body 3 of each clamping device 1.

Figure 6:
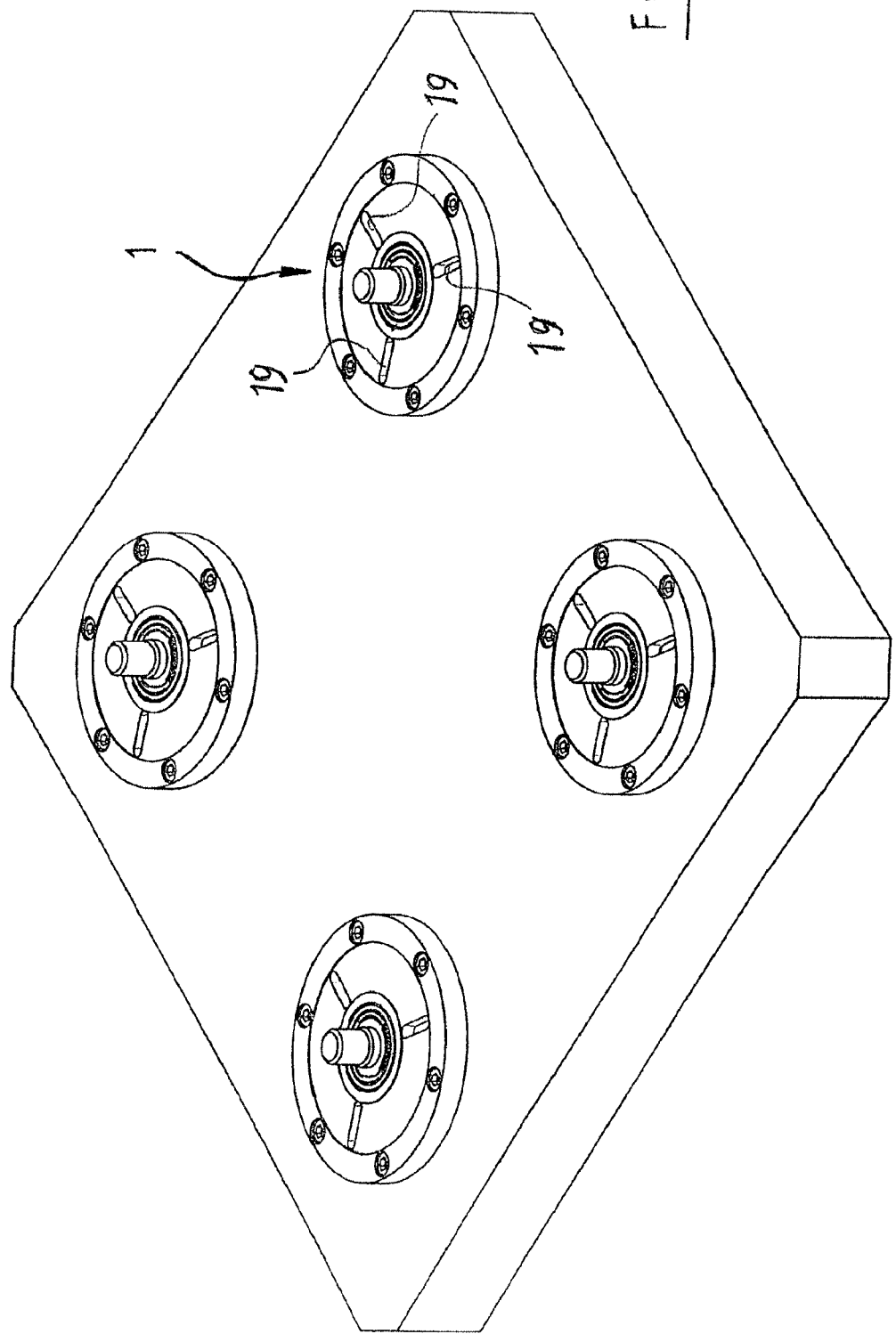
FIG. 6 is an arrangement of four clamping devices provided in a machine bed.
Figure 7:
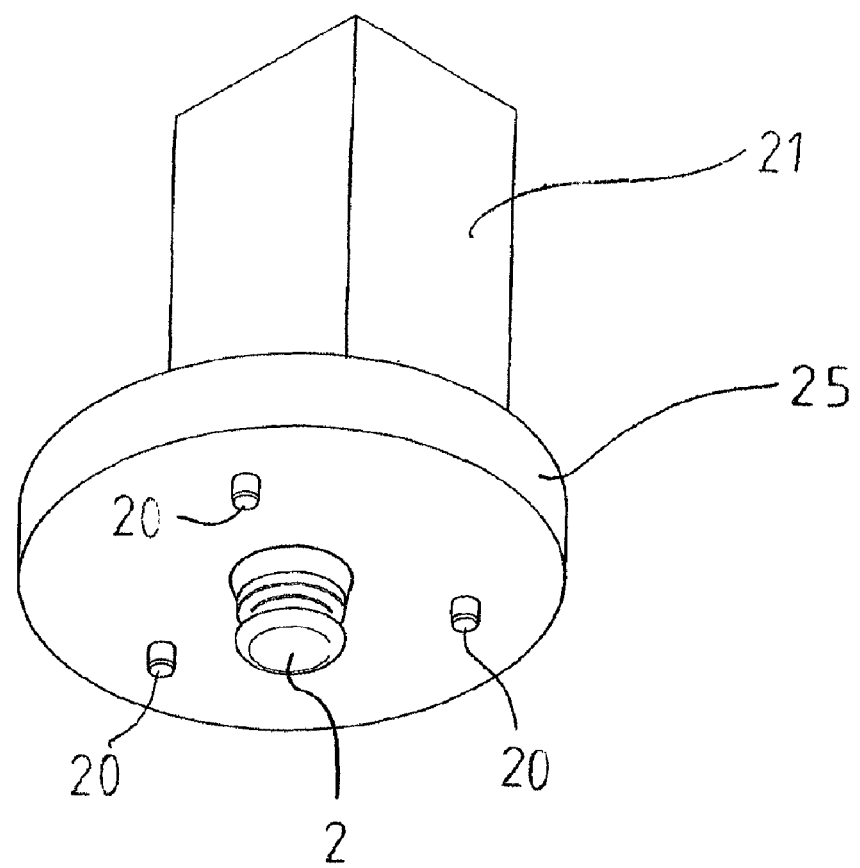
FIG. 7 is a workpiece carrier connected to a fixing element with workpiece.

In FIG. 6, the arrangement according to FIG. 5 in a perspective view is shown without a carrier. FIG. 6 also shows three longitudinal grooves 19 arranged over the periphery about the longitudinal axis 14 of each clamping device. They interact according to FIG. 7 with pins 20. The pins 20 extend from a carrier 25, which carries a workpiece 21, in the direction toward the clamping device downward into the grooves 19 and thus center the carrier 25 relative to the clamping device 1 or the receptacle 5. This centering is provided, in particular, where each clamping device is to receive an "independent" fixing element, where several fixing elements are arranged on a common carrier unlike carrier 17 according to FIG. 5.

Figure 8:
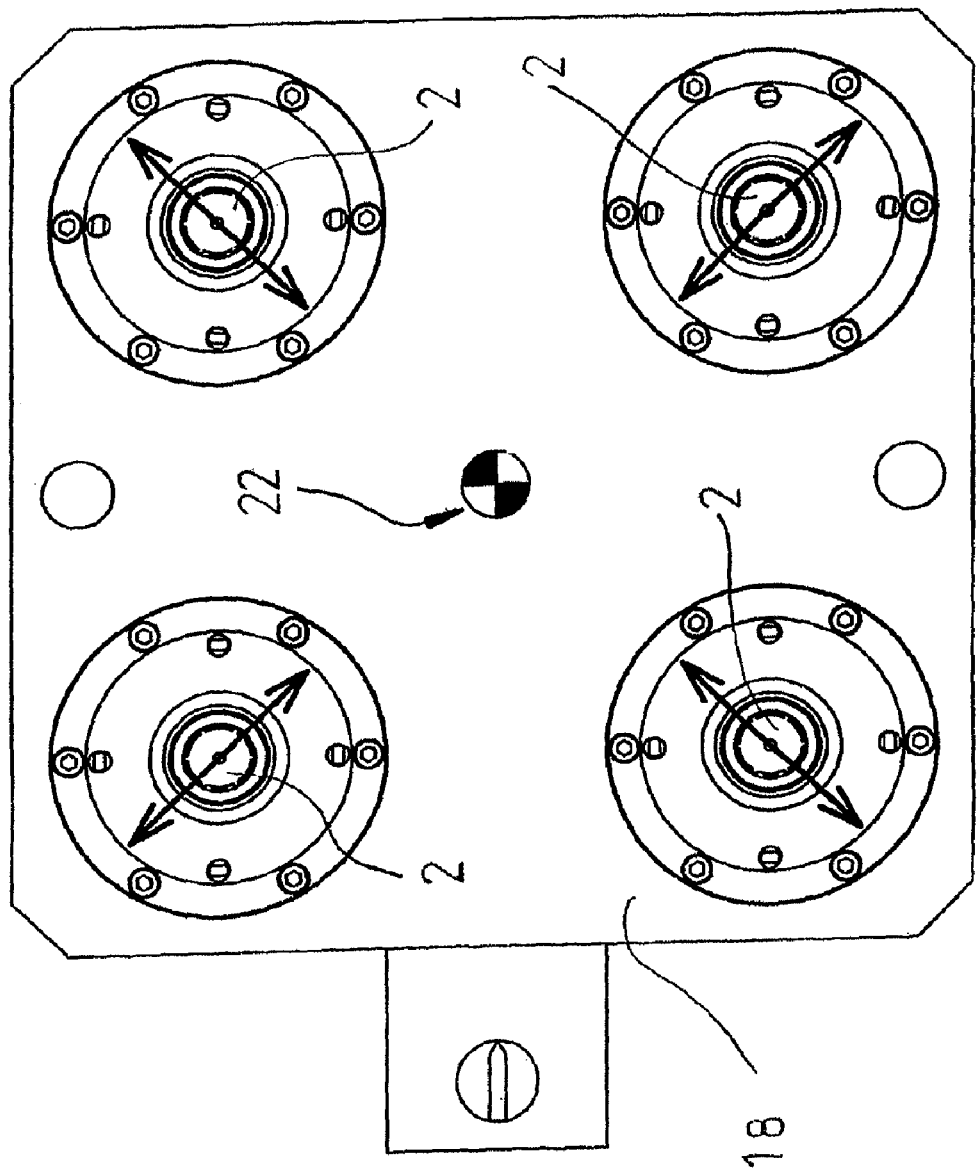
FIG. 8 is a top view of an arrangement according to FIG. 6.

FIG. 8 shows four fixing elements 2, which are provided for holding a carrier plate, in a machine bed 18. Each fixing element 2 is supported floating, so that its absolute clamping position in the machine bed 18 can be selected within given tolerances. Thus, (in particular, equivalent) heat expansions within the carrier to be inserted into the machine bed 18 are compensated, so that the carrier center always lies congruent over the center 22 of the machine bed.

As used in this disclosure and in the accompanying claims, the terms "comprising," "including," "carrying," "having," "containing," "involving," and the like are to be understood to be open-ended, that is, to mean including but not limited to.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A clamping device for use with a machine tool having a fixing element, the clamping device including:
  (a) a clamp body having a receptacle sized to receive an elongated shaft of the fixing element therein in an inserted position in which the longitudinal axis of the fixing element shaft coincides with a longitudinal axis of the receptacle, the clamp body also having at least one clamping element mounted thereon;
  (b) at least one clamping part in the receptacle that is (i) movable in one direction along a clamping part movement axis transverse to the longitudinal axis of the receptacle in response to a clamping force from the clamping element, and that is (ii) movable in an opposite direction along the clamping part movement axis in response to a releasing force from the clamping element;
  (c) the at least one clamping element including at least one deformable chamber bounded by at least one wall that is resistant to tension and pressure, the at least one deformable chamber being deformable in response to a change in pressure therein to produce a deformation force from forces running along the longitudinal axis of the at least one wall, wherein the deformation force is applied to the clamping part to produce the clamping force or the releasing force, the at least one deformable chamber also being constructed, so that, for an expansion thereof in a first direction, the cross section of the deformable chamber undergoes a change in length in a second direction perpendicular to the first direction; and
  (d) a contact surface on the clamping part which applies a force component in a direction parallel with the longitudinal axis of the receptacle when the clamping part is extended into the receptacle for applying the clamping force to the fixing element inserted into the receptacle.

2. The clamping device of claim 1 wherein the change in length is a shortening.

3. The clamping device of claim 1 wherein the deformation of the deformable chamber that results in the deformation force is directed essentially perpendicular to the deformation force.

4. The clamping device of claim 1 wherein the at least one wall bounding the deformable chamber is constructed for converting a change of fluid-dynamic compressive forces acting perpendicular to the at least one wall into mechanical tensile or compressive forces running in the longitudinal direction of the at least one wall.

5. The clamping device of claim 1 wherein the deformable chamber is bounded by two opposing walls.

6. The clamping device of claim 1 wherein the at least one wall has a convex or concave curvature relative to the interior of the deformable chamber when the deformable chamber is in an unpressurized condition.

7. The clamping device of claim 1 wherein the contact surface of the clamping part comprises a wedge surface which runs at an angle to the direction of the clamping force and faces into the receptacle.

8. The clamping device of claim 1 wherein the clamping element has a rotationally symmetric structure about the longitudinal axis of the receptacle.

9. The clamping device of claim 8 wherein the clamping force is directed inward in a radial direction toward the longitudinal axis of the receptacle.

10. The clamping device of claim 1 wherein the clamping part comprises a slotted clamping ring surrounding the receptacle.

11. The clamping device of claim 1 wherein the clamping part is biased in the direction of the clamping force or the releasing force.

12. The clamping device of claim 1 further including a centering cone within the receptacle in position to apply a centering force to the fixing element inwardly toward the longitudinal axis of the receptacle.

13. The clamping device of claim 12 wherein the centering cone is supported for movement in a predetermined amount perpendicular to, and away from, the longitudinal axis of the receptacle.

14. The clamping device of claim 13 wherein the centering cone is supported in a flexible medium embedded in the receptacle.

15. The clamping device of claim 13 wherein the centering cone comprises a distal end of a sleeve projection whose opposite end is fixed relative to the receptacle.

16. The clamping device of claim 1 wherein the clamp body has at least three elongated grooves formed in an outer surface thereof and extending radially from the longitudinal axis of the receptacle.

17. A clamping system including:
(a) a fixing element secured to a structure which is to be securely and releasably clamped in position, the fixing element including an elongated shaft extending from the structure;
(b) a clamp body having a receptacle sized to receive the elongated shaft of the fixing element therein in an inserted position in which the longitudinal axis of the fixing element shaft coincides with a longitudinal axis of the receptacle;
(c) a clamping element mounted on the clamp body;
(d) a clamping part that is (i) movable into the receptacle in a clamping direction along a clamping part movement axis transverse to the longitudinal axis of the receptacle in response to a clamping force from the clamping element, and that is (ii) movable in an opposite direction along the clamping part movement axis in response to a releasing force from the clamping element;
(e) the clamping element including a deformable chamber and wall structure, the deformable chamber and wall structure being deformable in response to a change in pressure in a chamber therein to produce a deformation force applied to the clamping part to produce the clamping force or the releasing force, the chamber and wall structure also being constructed, so that, for an expansion of the chamber therein in a first direction, the cross section of the chamber undergoes a change in length in a second direction perpendicular to the first direction; and
(f) a contact surface on the clamping part which applies a force component in a direction parallel with the longitudinal axis of the receptacle when the clamping part is extended into the receptacle for applying the clamping force to the fixing element inserted into the receptacle.

18. The clamping device of claim 1 further including a centering cone within the receptacle in position to apply a centering force to the fixing element inwardly toward the longitudinal axis of the receptacle.

19. The clamping device of claim 18 wherein the centering cone is supported in a flexible medium embedded in the receptacle.

20. The clamping device of claim 18 wherein the centering cone comprises a distal end of a projection sleeve whose opposite end is fixed relative to the receptacle.

* * * * *

UNITED STATES PATENT AND TRADEMARK OFFICE
CERTIFICATE OF CORRECTION

Page 1 of 1

PATENT NO.         : 8,123,233 B2
APPLICATION NO.    : 11/996070
DATED              : February 28, 2012
INVENTOR(S)        : Klaus Hofmann It is certified that error appears in the above-identified patent and that said Letters Patent is hereby corrected as shown below:

At column 6, line 20: change "the receptacle also includes" to read --the receptacle 5 also includes--.

At column 10, line 38: change "of claim 1 further" to read --of claim 17 further--.

Signed and Sealed this
Twenty-fourth Day of April, 2012

David J. Kappos
*Director of the United States Patent and Trademark Office*